(12) United States Patent
Sung et al.

(10) Patent No.: US 11,685,142 B2
(45) Date of Patent: Jun. 27, 2023

(54) COVER WINDOW AND DISPLAY DEVICE INCLUDING THE SAME

(71) Applicant: SAMSUNG DISPLAY CO., LTD., Yongin-si (KR)

(72) Inventors: Su Jin Sung, Hwaseong-si (KR); Young-Min Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/807,783

(22) Filed: Jun. 20, 2022

(65) Prior Publication Data

US 2023/0139791 A1 May 4, 2023

(30) Foreign Application Priority Data

Oct. 28, 2021 (KR) ........................ 10-2021-0145687

(51) Int. Cl.
| | | |
|---|---|---|
| *B32B 3/10* | (2006.01) | |
| *B32B 17/04* | (2006.01) | |
| *B32B 7/023* | (2019.01) | |
| *B32B 7/022* | (2019.01) | |
| *B32B 5/12* | (2006.01) | |
| *B32B 5/26* | (2006.01) | |

(52) U.S. Cl.
CPC ................ *B32B 17/04* (2013.01); *B32B 5/12* (2013.01); *B32B 5/266* (2021.05); *B32B 7/022* (2019.01); *B32B 7/023* (2019.01); *B32B 2250/02* (2013.01); *B32B 2250/03* (2013.01); *B32B 2250/20* (2013.01); *B32B 2260/023* (2013.01); *B32B 2260/046* (2013.01); *B32B 2262/101* (2013.01); *B32B 2307/54* (2013.01); *B32B 2457/20* (2013.01)

(58) Field of Classification Search
None
See application file for complete search history.

(56) References Cited

FOREIGN PATENT DOCUMENTS

| JP | 2020-075367 | | 5/2020 |
|---|---|---|---|
| JP | 2020075367 A | * | 5/2020 |
| KR | 10-0961118 | | 6/2010 |
| KR | 10-2015-0115122 | | 10/2015 |
| KR | 10-2150390 | | 9/2020 |

OTHER PUBLICATIONS

Machine translation of JP-2020075367-A (Year: 2020).*

* cited by examiner

*Primary Examiner* — Christopher M Polley
(74) *Attorney, Agent, or Firm* — F. Chau & Associates, LLC

(57) ABSTRACT

A cover window according to an embodiment includes a first layer having a first Young's modulus, and a second modulus layer disposed on the first modulus layer and having a second Young's modulus greater than the first Young's modulus. Each of the first modulus layer and the second modulus layer includes a polymer resin and glass fibers, and a volume ratio of the glass fibers in the first modulus layer is greater than a volume ratio of the glass fibers in the second modulus layer.

10 Claims, 11 Drawing Sheets

US 11,685,142 B2

COVER WINDOW AND DISPLAY DEVICE INCLUDING THE SAME

CROSS-REFERENCE TO RELATED APPLICATION

This application claims priority to and the benefit of Korean Patent Application No. 10-2021-0145687 filed in the Korean Intellectual Property Office on Oct. 28, 2021, the entire contents of which are herein incorporated by reference.

BACKGROUND

(a) Technical Field

This disclosure relates to a cover window for covering a display panel, and a display device including a display panel and a cover window.

(b) Description of the Related Art

Display devices such as an emissive display device or a liquid crystal display include a display panel manufactured by forming various layers and parts on a substrate. The display device includes a cover window provided on the display panel to cover the display panel, protects the display panel from external impacts, and transmits images displayed on the display panel.

The cover window may be made of a transparent material such as glass and plastic so that a user can view the images displayed on the display panel. A cover window made of glass may have high surface hardness and may have low impact resistance. On the contrary, the cover window made of plastic may have low surface hardness and may have high impact resistance.

The above information disclosed in this Background section is only for enhancement of understanding of the background, and therefore it may contain information that does not form the prior art that is already known in this country to a person of ordinary skill in the art.

SUMMARY

The inventive concept has been made in an effort to provide a cover window with excellent surface hardness and impact resistance, and a display device including the same.

An embodiment provides a cover window including a first layer having a first Young's modulus, and a second layer disposed on the first layer and having a second Young's modulus greater than the first Young's modulus. Each of the first layer and the second layer includes a polymer resin and glass fibers, and a volume ratio of the glass fibers in the first layer is greater than a volume ratio of the glass fibers in the second layer.

A density of the glass fibers in the first layer may be lower than a density of the glass fibers in the second layer.

An average diameter of the glass fibers included in the first layer may be equal to an average diameter of the glass fibers in the second layer.

An average gap among the glass fibers that are included in the first layer and are adjacent in a horizontal direction may be greater than an average gap among the glass fibers that are included in the second layer and are adjacent in the horizontal direction.

An average diameter of the glass fibers included in the second layer may be greater than an average diameter of the glass fibers included in the first layer.

An average gap among the glass fibers that are included in the first layer and are adjacent in the horizontal direction may be equal to an average gap among the glass fibers that are included in the second layer and are adjacent in the horizontal direction.

An average gap among the glass fibers that are included in the first layer and are adjacent in the horizontal direction may be greater than an average gap among the glass fibers that are included in the second layer and are adjacent in the horizontal direction.

The first layer and the second layer may be integrated into a single layer.

A polymer resin of the first layer and a polymer resin of the second layer may be made of a same material.

In each of the first layer and the second layer, a refractive index difference between the polymer resin and a material of the glass fibers may be less than 0.01 to prevent the glass fibers from being visible from each of the first layer and the second layer.

An embodiment provides a display device including a display panel and a cover window disposed on the display panel. The cover window includes a first layer having a first Young's modulus, and a second layer disposed on the first layer and having a second Young's modulus greater than the first Young's modulus. Each of the first layer and the second layer includes a polymer resin and glass fibers, and a volume ratio of the glass fibers in the first layer is less than a volume ratio of the glass fibers in the second layer.

A density of the glass fibers in the first layer may be higher than a density of the glass fibers in the second layer.

An average diameter of the glass fibers included in the first layer may be equal to an average diameter of the glass fibers included in the second layer.

An average gap among the glass fibers that are included in the first layer and are adjacent in a horizontal direction may be greater than an average gap among the glass fibers that are included in the second layer and are adjacent in the horizontal direction.

An average diameter of the glass fibers included in the first layer may be less than an average diameter of the glass fibers included in the second layer.

An average gap among the glass fibers that are included in the first layer and are adjacent in a horizontal direction may be equal to an average gap among the glass fibers that are included in the second layer and are adjacent in the horizontal direction.

An average gap among the glass fibers that are included in the first layer and are adjacent in a horizontal direction may be greater than an average gap among the glass fibers that are included in the second layer and are adjacent in the horizontal direction.

The first layer and the second layer may be integrated into a single layer, and a polymer resin of the first layer and a polymer resin of the second layer may include a same material.

The cover window may be attached to the display panel by an adhesive layer or may be coated on the display panel.

In each of the first layer and the second layer, a refractive index difference between the polymer resin and the glass fiber may be less than 0.01 to prevent the glass fibers from being visible from each of the first layer and the second layer.

According to the embodiments, the cover window with high surface hardness and impact resistance and the display device including the same may be provided. According to the embodiments, effects recognizable in the entire specification may be obtained.

DETAILED DESCRIPTION OF THE EMBODIMENTS

The inventive concept will be described more fully hereinafter with reference to the accompanying drawings, in which exemplary embodiments of the inventive concept are shown.

The sizes and the thicknesses of the components are exemplarily provided for the convenience of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Unless explicitly described to the contrary, the word "comprise" and variations such as "comprises" or "comprising" will be understood to imply the inclusion of stated elements, but not the exclusion of any other elements.

When it is described that a part is "connected (in contact with, coupled)" to another part, the part may be "directly connected" to the other element, may be "connected" to the other part through a third part, or may be connected to the other part physically or electrically, and they may be referred to by different titles depending on positions or functions, but respective portions that are substantially integrated into one body may be connected to each other. As used herein, components described as being "electrically connected" are configured such that an electrical signal can be transferred from one component to the other (although such electrical signal may be attenuated in strength as it transferred and may be selectively transferred).

Terms "x", "y", and "z" are used, and here, "x" is a first direction, "y" is a second direction that is perpendicular to the first direction, and "z" is a third direction that is perpendicular to the first direction and the second direction.

Figure 1:
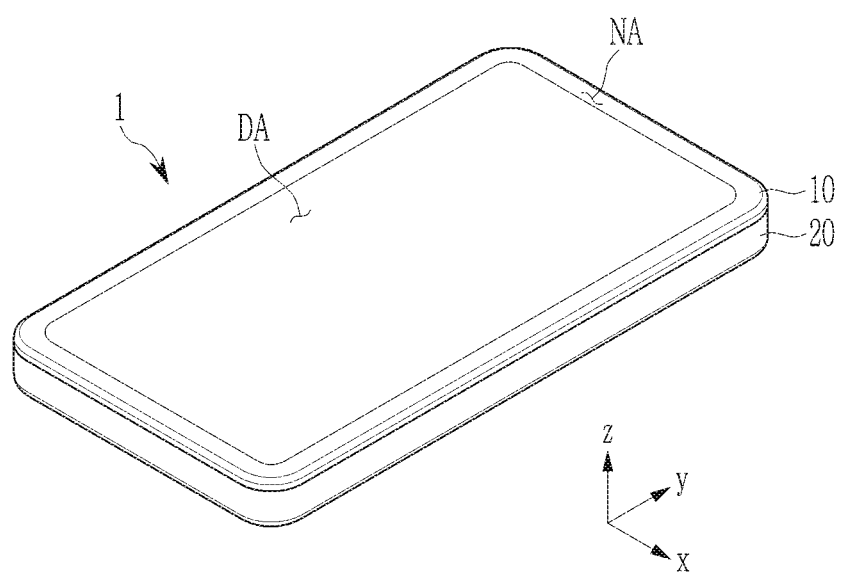
FIG. 1 shows a perspective view of an electronic device having a display device according to an embodiment of the present invention.
Figure 2:
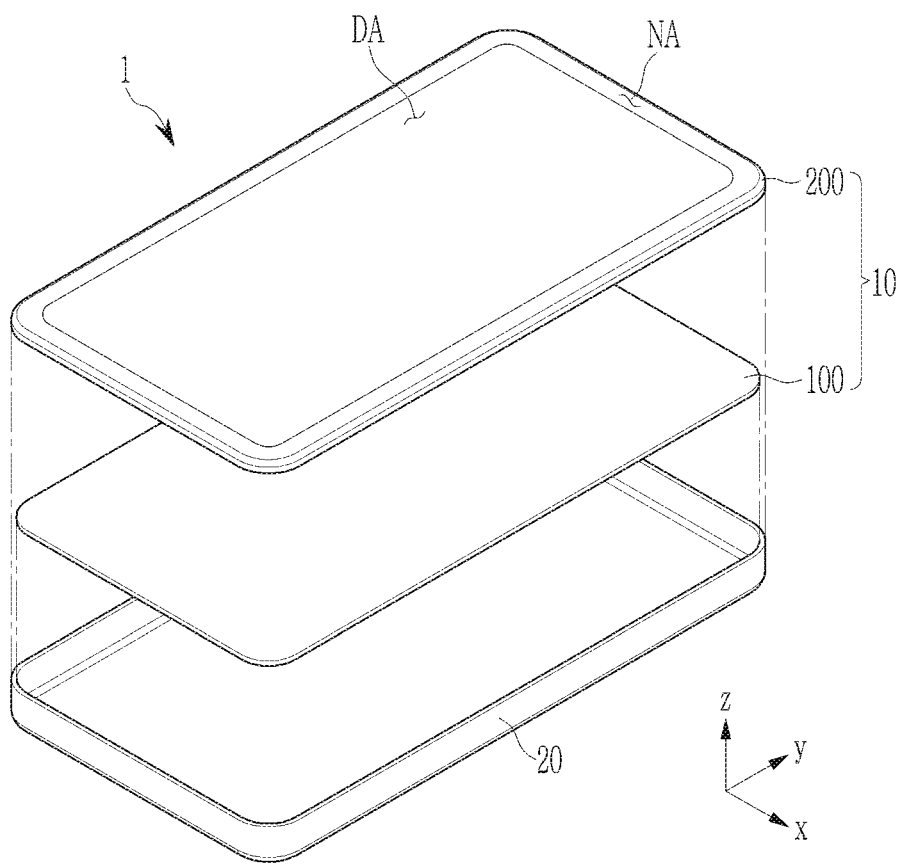
FIG. 2 shows an exploded perspective view of an electronic device shown in FIG. 1 according to an embodiment of the present invention.

FIG. 1 shows a perspective view of an electronic device 1 having a display device 10 according to an embodiment, and FIG. 2 shows an exploded perspective view of an electronic device 1 shown in FIG. 1.

Referring to FIG. 1 and FIG. 2, the display device 10 may be applied to electronic devices such as a smartphone, a mobile phone, a tablet, a multimedia player, and a game device. The electronic device 1 may include a display device 10 and a housing 20. The display device 10 may provide a screen for displaying images in the electronic device 1. The housing 20 may be referred to as a set frame and may fix the display device 10. A plurality of parts configuring the electronic device 1 may be positioned in an internal space defined by the display device 10 and the housing 20. For example, a processor, a memory, a battery, a driver, a camera, a speaker, a microphone, a receiver, a communication module, and a sensor may be positioned in the electronic device 1.

The electronic device 1 may include a display area DA and a non-display area NA. The display area DA displays images, it may correspond to the screen, and it may be positioned at the front of the electronic device 1. The non-display area NA may surround at least part of the display area DA. The present invention is not limited thereto. In an embodiment, the entire front of the electronic device 1 may be the display area DA.

The display device 10 may include a display panel 100 and a cover window 200. The display panel 100 may be attached to the cover window 200. The cover window 200 may be coated on the display panel 100.

The display panel 100 may include pixels arranged in the region corresponding to the display area DA and may display the images by a combination of the pixels. The display panel 100 may include pixel circuits and signal lines for driving pixels. The display panel 100 may be a light emitting display panel including light-emitting devices, and the respective light-emitting devices may configure the pixels. The display panel 100 may include a touch sensor layer for sensing touches.

The cover window 200 may cover the display panel 100 and may transmit the image displayed on the display panel 100. The cover window 200 may be a protection cover for protecting the display panel 100 from external impacts. The cover window 200 may be positioned at the outside of the display panel 100 in the electronic device 1. The cover window 200 may function as a supporter for maintaining a planar and/or curved state of the display panel 100.

The electronic device 1 may be rigid. The electronic device 1 may include a flexible portion that may be bent, folded, or rolled. For example, the electronic device 1 may be a foldable electronic device that is folded so that two regions of the display area DA face each other (i.e., in-foldable) or two regions of the display area DA may be disposed in opposite directions (i.e., out-foldable). When the electronic device 1 includes a flexible portion, the display device 10 may be a flexible display device including the corresponding flexible portion.

Figure 3:
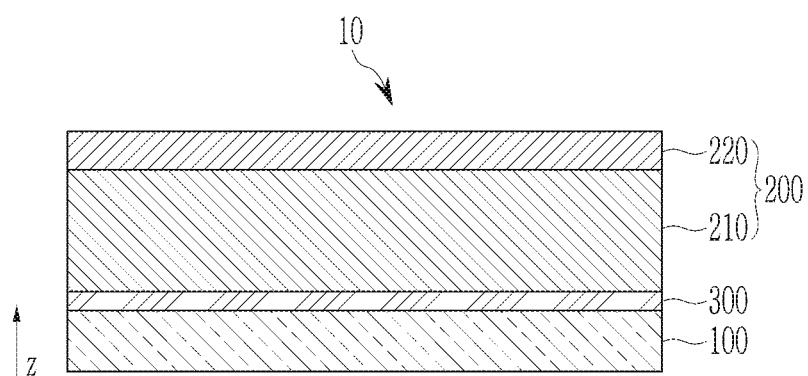
FIG. 3 and FIG. 4 respectively show a cross-sectional view of a display device according to an embodiment of the present invention.
Figure 4:
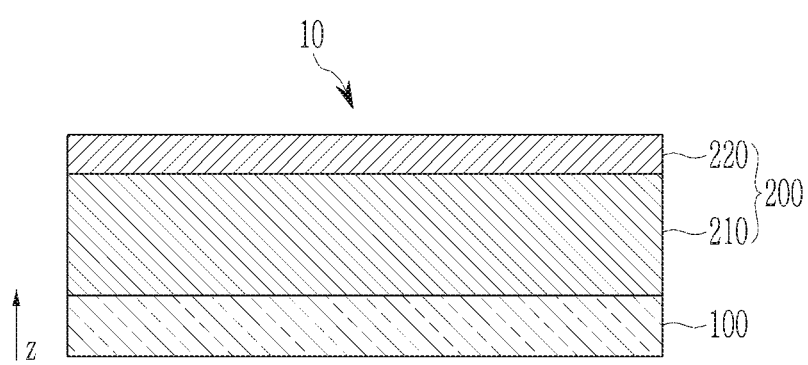

FIG. 3 and FIG. 4 respectively show a cross-sectional view of a display device 10 according to an embodiment.

Referring to FIG. 3, the display device 10 may include a display panel 100 and a cover window 200 positioned on the display panel 100. The display panel 100 may be attached to the cover window 200. The display device 10 may include an adhesive layer 300, between the display panel 100 and the cover window 200, for attaching the display panel 100 to the cover window 200. A detailed configuration of the display panel 100 will be described in a later part of the present specification (refer to FIG. 11 and corresponding descriptions). The adhesive layer 300 may include or may be formed of an adhesive such as an optically clear adhesive (OCA) and an optically clear resin (OCR).

The cover window 200 may include a plurality of modulus layers 210 and 220. For example, the cover window 200 may include a first modulus layer 210 and a second modulus layer 220 having a modulus that is greater than the modulus of the first modulus layer 210. The modulus may signify a Young's modulus or a modulus of elasticity. The second modulus layer 220 may be positioned on the first modulus layer 210. The second modulus layer 220 and the first modulus layer 210 may be integrated into a single modulus layer. For example, the integrated single modulus layer may not have an adhesive layer for attachment. Regarding the display panel 100, the first modulus layer 210 may be positioned between the display panel 100 and the second modulus layer 220. The adhesive layer 300 may contact an upper side of the display panel 100 and a lower side of the first modulus layer 210.

The first modulus layer 210 and the second modulus layer 220 may respectively include polymer resins and glass fibers. The polymer resin may include or may be formed of a resin such as an epoxy resin and an acryl-based resin. The polymer resins and the glass fibers may have identical or almost the same refractive index as each other so that influences on optical characteristics generated by a mixture of different materials may be minimized. For example, a refractive index difference between the polymer resin and a material of the glass fibers may be less than 0.01. When the refractive index difference is equal to or greater than 0.01, the glass fibers are visible. A ratio (e.g., a volume ratio) of the glass fibers of the first modulus layer 210 and the second modulus layer 220 may be about 5% to about 50%. A ratio of the polymer resin of the first modulus layer 210 and second modulus layer 220 may be about 50% to about 95%. In an embodiment, a sum of a ratio (e.g., a volume ratio) of the glass fibers of the first modulus layer 210 and a ratio (e.g., a volume ratio) of the polymer resin of the first modulus layer 210 may be 100%. For example, a ratio of the polymer resin of the first modulus layer 210 may be 5%, and a ratio of the glass fibers of the first modulus layer 210 may be 95%. In an embodiment, a sum of a ratio of the glass fibers of the second modulus layer 220 and a ratio of the polymer resin of the second modulus layer 220 may be 100%. For example, a ratio of the polymer resin of the second modulus layer 220 may be 5%, and a ratio of the glass fibers of the second modulus layer 220 may be 95%. The polymer resins may have a modulus of less than about 10 Gigapascal (GPa), and the glass fibers may have a modulus of equal to or greater than about 10 GPa (e.g., about 60 GPa to about 100 GPa).

The cover window 200 may have a multi-layered structure in which a second modulus layer 220 that has a greater modulus than the first modulus layer 210 is stacked on the first modulus layer 210. The first modulus layer 210 may increase impact resistance of the cover window 200, and the second modulus layer 220 may increase surface hardness of the cover window 200. The first modulus layer 210 may absorb external impacts to protect the display panel 100 (e.g., to prevent cracks on the display panel 100). The second modulus layer 220 may increase scratch resistance and abrasion resistance, and the second modulus layer 220 may protect the first modulus layer 210 from external conditions (particularly, scratches).

The cover window 200 may have a thickness of equal to or less than about 1 millimeter (mm), for example, about 300 micrometer (μm) to about 900 μm, or about 400 μm to about 800 μm. As the first modulus layer 210 becomes thicker, it may be advantageous in the impact resistance characteristic, so the second modulus layer 220 may be thinner than the first modulus layer 210. For example, the thickness of the second modulus layer 220 may be equal to or less than about 70%, about 50%, or about 30% of the thickness of the first modulus layer 210.

Referring to FIG. 4, the display device 10 may include a display panel 100 and a cover window 200 positioned on the display panel 100. Differing from an embodiment in which the cover window 200 is a film type, as described with reference to FIG. 3, the cover window 200 may be a coating-type cover window that is coated on the display panel 100. For example, the cover window 200 may be positioned on the display panel 100, and no adhesive layer 300 may be positioned between the display panel 100 and the cover window 200. The upper side of the display panel 100 may contact the lower side of the cover window 200. The above-noted configuration may be formed by coating the cover window 200 on the display panel 100. For example, the first modulus layer 210 and the second modulus layer 220 of the cover window 200 may be formed on the display panel 100 according to a coating method. In an embodiment, the first modulus layer 210 of the cover window 200 may be formed on the display panel 100 by the coating method, and the second modulus layer 220 may be formed on the first modulus layer 210 by the coating method. The second modulus layer 220 may be integrated with the first modulus layer 210 into a single modulus layer. The integrated single modulus layer may not include an adhesive layer for attachment.

As the cover window 200 includes the first modulus layer 210 with a small modulus and the second modulus layer 220 with a big modulus in a like way of an embodiment described with reference to FIG. 3, impact resistance and surface hardness may be increased. The first modulus layer 210 and the second modulus layer 220 may respectively include polymer resins and glass fibers.

Figure 5:
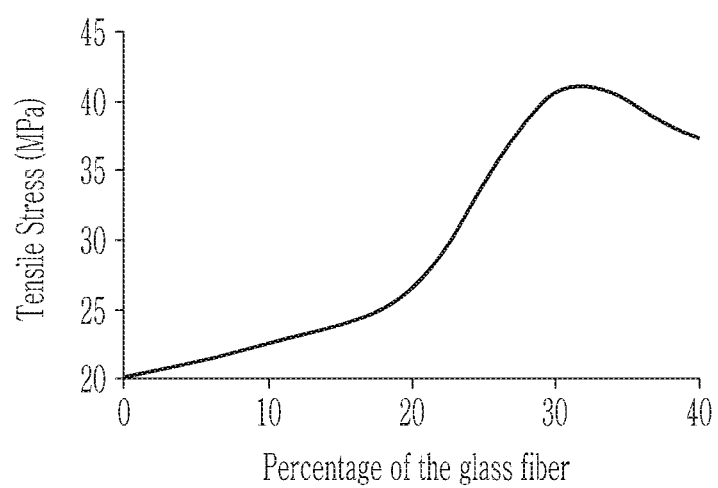
FIG. 5 shows a graph of a relationship between a content of glass fibers and tensile stresses according to an embodiment of the present invention.

FIG. 5 shows a graph of a relationship between a content of glass fibers and tensile stresses.

The moduli of the first modulus layer 210 and the second modulus layer 220 of the above-described cover window 200 may be controlled by adjusting the ratio (e.g., the volume ratio of the glass fibers of the respective modulus layers) of the glass fibers. Referring to FIG. 5, the tensile stress may increase as the ratio of the glass fibers increases (up to about 32%). When the tensile stress increases, the modulus increases. The adjustment or control of the ratio of the glass fibers may allow the first modulus layer 210 and the second modulus layer 220 to have desired moduli, respectively.

Figure 6:
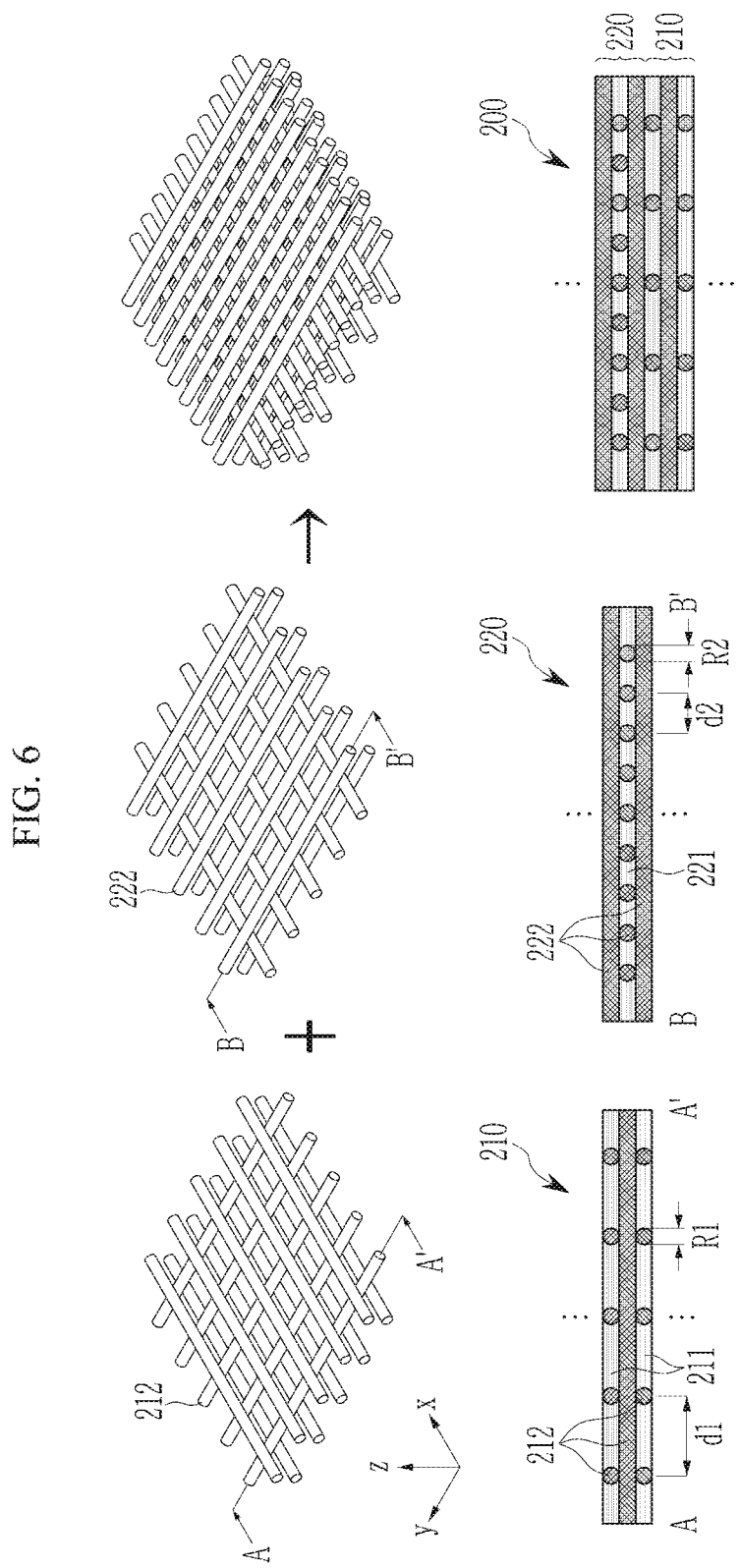
FIG. 6 and FIG. 7 respectively show a configuration of a cover window according to an embodiment of the present invention.
Figure 7:
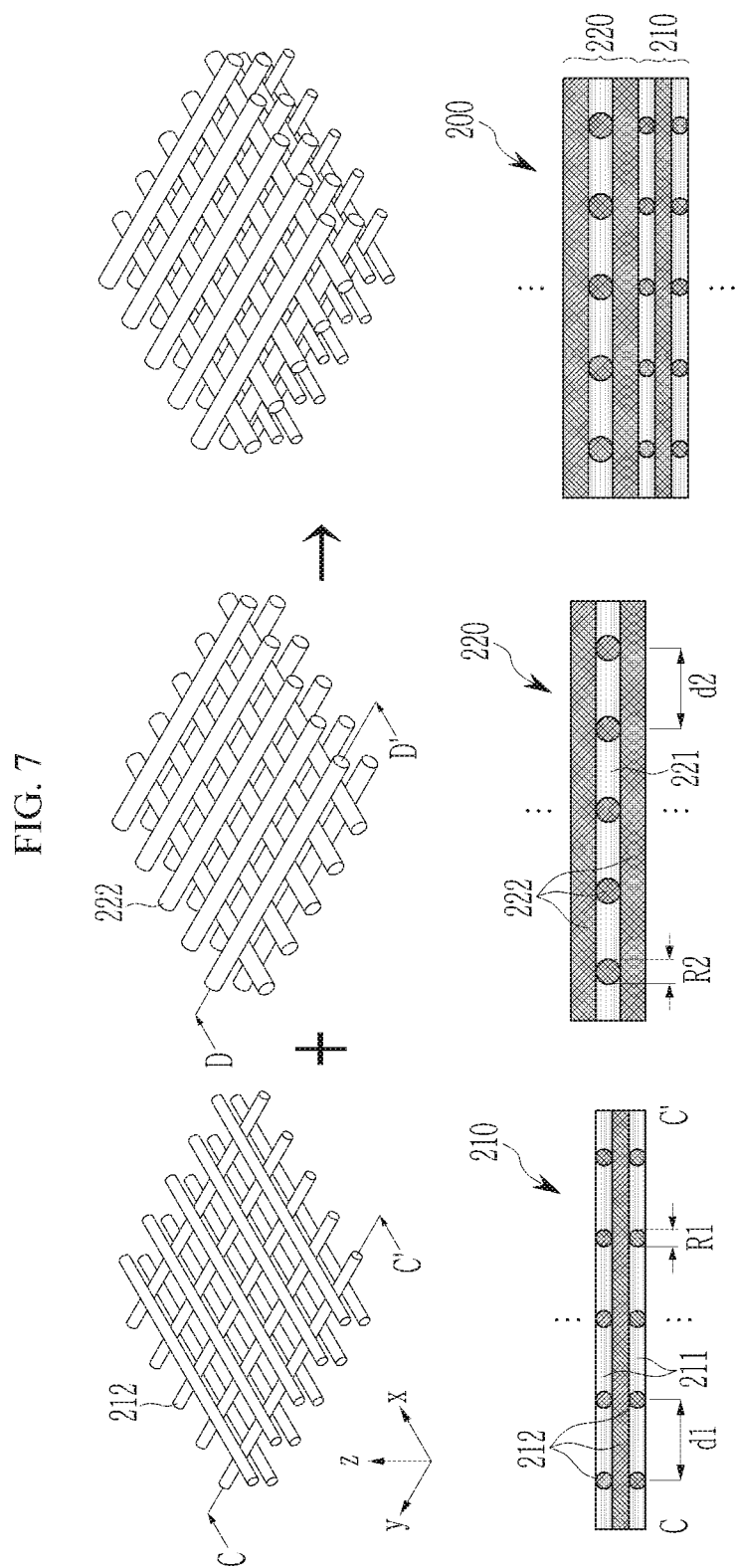

FIG. 6 and FIG. 7 respectively show a configuration of a cover window 200 according to an embodiment.

Referring to FIG. 6, disposal of the glass fibers 212 and 222 included by the first modulus layer 210 and the second modulus layer 220 of the cover window 200 and cross-sections of the first modulus layer 210 and the second modulus layer 220 are shown. The cover window 200 may have a structure in which the second modulus layer 220 is stacked on the first modulus layer 210.

The first modulus layer 210 may include a polymer resin 211 and a glass fibers 212. The glass fibers 212 may be disposed or may be buried in the polymer resin 211. The glass fibers 212 may be arranged in a predetermined direction and may be arranged at a predetermined gap d1 (or pitch). In an embodiment, the glass fibers may be uniformly arranged in the polymer resin 211, and two neighboring glass fibers may have substantially the same gap d1. In an embodiment, the gap d1 may represent an average gap of a predetermined number (e.g., 100) of pair of two adjacent glass fibers. The gap may signify a distance between centers of the glass fibers that are adjacent to each other in a horizontal direction. The glass fibers 212 may be stacked as multi-layered, and the arranged direction (the direction in which the glass fibers 212 extend) of the glass fibers 212 of the respective layers may be different from the arranged direction of the glass fibers 212 of the adjacent layers. The arranged direction of the glass fibers 212 on one layer and the arranged direction of the glass fibers 212 on the adjacent layer may form an angle of about 10° to about 90°, about 30° to about 90°, or about 60° to about 90°. For example, when the glass fibers 212 on one layer are arranged in the first direction x, the glass fibers 212 on the upper layer thereof may be arranged in the second direction y. The glass fibers 212 that are adjacent in the vertical direction may contact each other. Terms such as "same," "equal," or "uniformly," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to emphasize this meaning, unless the context or other statements indicate otherwise. For example, items described as "substantially the same," "substantially equal," or "substantially planar," may be exactly the same, equal, or planar, or may be the same, equal, or planar within acceptable variations that may occur, for example, due to manufacturing processes. Terms such as "about" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

The glass fibers 212 may be uniformly disposed and distributed on the first modulus layer 210, and a physical property of the first modulus layer 210 may be uniform in the entire region. A diameter R1 of the glass fiber 212 may be equal to or less than about 100 micrometer (μm), about 50 μm, about 30 μm, or about 10 μm, and it is not limited thereto. The glass fibers 212 may have substantially the same diameter. In an embodiment, the diameter R1 may represent an average diameter of the glass fibers 212. The average diameter may be determined by measuring a predetermined number (e.g., 100 glass fibers or 10% of a total number of glass fibers) of glass fibers randomly chosen. The glass fibers 212 are shown to be stacked as three layers, but they may be stacked as a greater or lesser number of layers depending on the thickness of the first modulus layer 210 and the diameter R1 of the glass fiber 212.

The second modulus layer 220 may include polymer resins 221 and glass fibers 222. The polymer resin 221 may be made of the same material as the polymer resin 211 of the first modulus layer 210. The present invention is not limited thereto. In an embodiment, the polymer resin 221 and the polymer resin 211 may be made of or may include other materials. The glass fibers 222 may be impregnated to the polymer resin 221. The glass fibers 222 may be arranged in a predetermined direction and may be arranged at a predetermined gap d2 (or pitch). The glass fibers 222 may be stacked as multi-layered, and the arranged direction of the glass fibers 222 of the respective layers may be different from the arranged direction of the glass fibers 222 of the adjacent layers. The arranged direction of the glass fibers 222 of one layer and the arranged direction of the glass fibers 222 of the adjacent layer may form an angle of about 10° to about 90°, about 30° to about 90°, or about 60° to about 90°. For example, when the glass fibers 222 of one layer are arranged in the second direction y, the glass fibers 222 provided thereon may be arranged in the first direction x. The glass fibers 222 that are adjacent in the vertical direction may contact each other.

The glass fibers 222 may be uniformly disposed and distributed on the second modulus layer 220, so the physical property of the second modulus layer 220 may be uniform in the entire region. The diameter R2 of the glass fibers 222 may be equal to or less than about, 100 μm, about 50 μm, about 30 μm, or about 10 μm, and it is not limited thereto. The glass fibers 222 are shown to be stacked as three layers, but they may be stacked as a greater or lesser number of layers depending on the thickness of the second modulus layer 220 and the diameter R2 of the glass fiber 222. The glass fibers 222 may have substantially the same diameter. In an embodiment, the diameter R2 may represent an average diameter of the glass fibers 222. The average diameter may be determined by measuring a predetermined number (e.g., 100 glass fibers or 10% of a total number of glass fibers) of glass fibers randomly chosen.

The glass fiber 222 included in the second modulus layer 220 may have the same or substantially the same diameter as the glass fiber 212 included in the first modulus layer 210. The glass fibers 222 included in the second modulus layer 220 may be further densely arranged than the glass fibers 212 included in the first modulus layer 210. For example, a density of the glass fibers 212 included in the first modulus layer 210 may be less than a density of the glass fibers 222 included in the second modulus layer 220. For example, the gap d2 or the pitch among the adjacent glass fibers 222 on the second modulus layer 220 may be less than the gap d1 or the pitch among the adjacent glass fibers 212 on the first modulus layer 210. As the glass fibers 222 are further densely arranged than the glass fibers 212 are, the ratio of the glass fibers 222 on the second modulus layer 220 may be greater than the ratio of the glass fibers 212 on the first modulus layer 210. Hence, the modulus of the second modulus layer 220 may be greater than the modulus of the first modulus layer 210.

In an embodiment, the glass fiber 222 included in the second modulus layer 220 may have a different diameter from the glass fibers 212 included in the first modulus layer 210. For example, when the diameter R2 of the glass fiber 222 is lesser or greater than the diameter R1 of the glass fiber 212, a desired modulus may be obtained by increasing or reducing the density of the glass fibers 222, compared to the case of the same diameters R1 and R2.

Referring to FIG. 7, the disposal of the glass fibers 212 and 222 included by the first modulus layer 210 and the second modulus layer 220 of the cover window 200 and the cross-sections of the first modulus layer 210 and the second modulus layer 220 are shown. The cover window 200 may have a structure in which the second modulus layer 220 is stacked on the first modulus layer 210.

Configurations of the first modulus layer 210 and the second modulus layer 220 and arrangements of the glass fibers 212 and 222 may substantially the same as an embodiment described with reference to FIG. 6. However, the diameter R2 of the glass fiber 222 included by the second modulus layer 220 may be greater than the diameter R1 of the glass fiber 212 included by the first modulus layer 210. The gap d2 among the glass fibers 222 may be the same or substantially the same as the gap d1 among the glass fibers 212. When the diameter R2 of the glass fibers 222 is greater than the diameter R1 of the glass fibers 212, and the gap d2 among the adjacent glass fibers 222 is equal to the gap d1 among the glass fibers 212, the ratio of the glass fibers 222 on the second modulus layer 220 may be greater than the ratio of the glass fibers 212 on the first modulus layer 210. Therefore, the modulus of the second modulus layer 220 may be greater than the modulus of the first modulus layer 210.

Although not shown, the glass fibers 222 included in the second modulus layer 220 may have a greater diameter than the glass fibers 212 included in the first modulus layer 210 and may be further densely arranged than the same. The modulus difference between the first modulus layer 210 and the second modulus layer 220 may be greater than the modulus difference according to an embodiment described with reference to FIG. 6 and an embodiment described with reference to FIG. 7. In an embodiment, the second modulus layer 220 may include the glass fibers 222 of which diameter is equal to or greater than the diameter of the glass fibers 212, the diameters of the glass fibers 222 and the glass fibers 212 are different from each other, and the glass fibers 222 may be arranged with the same or substantially the same gap as the glass fibers 212. In any cases, the ratio of the glass fibers 222 on the second modulus layer 220 may be greater than the ratio of the glass fibers 212 on the first modulus layer 210, and hence, the modulus of the second modulus layer 220 may be greater than the modulus of the first modulus layer 210.

Figure 8:
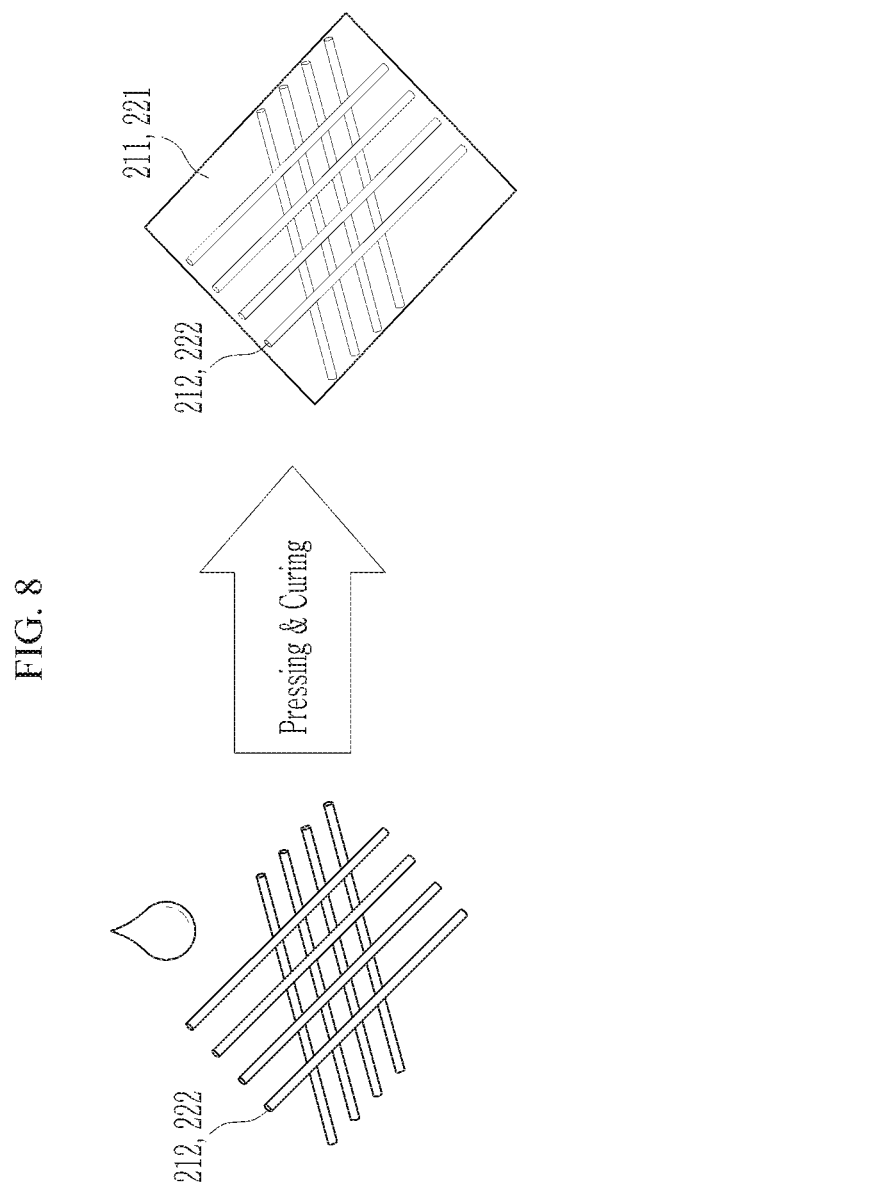
FIG. 8 shows a method for manufacturing a cover window according to an embodiment of the present invention.

FIG. 8 shows a method for manufacturing a cover window 200 according to an embodiment.

Referring to FIG. 8, the glass fibers 212 and 222 may be placed on a predetermined material (e.g., a process supporter) and a resin such as an epoxy resin and an acryl-based resin may be applied to the glass fibers 212 and 222 to form the first modulus layer 210 and the second modulus layer 220. Although not explicitly shown, the glass fibers 212 may be disposed on the material as shown in FIG. 6 and the glass fibers 222 may be disposed on the glass fibers 212 as shown in FIG. 7. The glass fibers 212 and 222 and the resin are pressurized so that the resin may flow into spaces among the glass fibers 212 and 222, and the resin is cured (e.g., UV-cured) so the cover window 200 in which the second modulus layer 220 including the polymer resin 221 and the glass fibers 222 may be positioned on the first modulus layer 210 including the polymer resin 211 and the glass fibers 212.

As described above, the glass fibers 222 of the second modulus layer 220 may be further densely arranged than the glass fibers 212 of the first modulus layer 210 or may have a greater diameter than a diameter of the glass fibers 212 of the first modulus layer 210. The resin is applied and cured while the glass fibers 212 and 222 of the first and second modulus layers 210 and 220 are disposed, so the first and second modulus layers 210 and 220 may be integrated. Distinguishing of layers among the first and second modulus layers 210 and 220 may be determined by the glass fibers 212 and 222 (i.e., the layer including the glass fibers 212 is the first modulus layer 210, and the layer including the glass fibers 222 is the second modulus layer 220). Differing from this, the glass fibers 212 may be disposed and resin is applied and cured to form the first modulus layer 210, and the glass fibers 222 may be disposed and resin is applied and cured to form the second modulus layer 220.

The manufactured cover window 200 is separated from the material (i.e., the process supporter) and is attached to the display panel 100 through the adhesive layer 300 as shown in FIG. 3, thereby configuring the display device 10. By coating the cover window 200 on the display panel 100 instead of the material, the display device 10 in which the cover window 200 is coated on the display panel 100 as shown in FIG. 4 may be manufactured.

Figure 9:
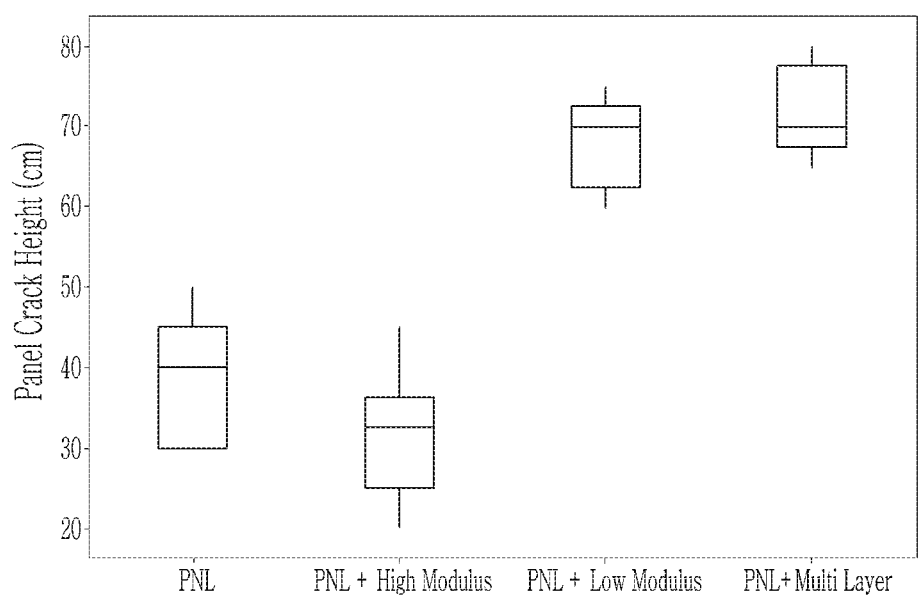
FIG. 9 is a graph showing performance improvement of impact resistance according to an embodiment of the present invention.

FIG. 9 is a graph showing performance improvement of impact resistance according to an embodiment.

Referring to FIG. 9, results of a ball drop test on 1) a display panel (including no cover window), represented using a label PNL on the x-axis 2) a display device in which a cover window with a high modulus is attached to the display panel, represented using a label "PNL+High Modulus" on the x-axis 3) a display device in which a cover window with a low modulus is attached to the display panel, represented using a label "PNL+Low Modulus" on the x-axis and 4) a display device in which a cover window including two layers of the low-modulus layer and the high-modulus layer is attached to the display panel, represented using a label "PNL+Multi Layer" on the x-axis. In the graph, a vertical axis represents a ball drop height by which the display panel is damaged (or broken).

When the high-modulus cover window (e.g., including silsesquioxane) is attached, impact resistance performance is shown to be low, compared to the display panel having a low modulus layer or a multi-modulus layer. The case in which the low-modulus cover window is attached and the case in which the cover window including complex layers of a low-modulus layer and a high-modulus layer are shown to significantly improve the impact resistance performance. However, while the cover window including a low-modulus layer is weak in external conditions (scratches, wear, etc.), the cover window including complex layers may increase surface hardness by the high-modulus layer, thereby protecting the low-modulus layer. As described above, by attaching or coating the cover window in the multilayered structure of the low-modulus layer and the high-modulus layer to/on the display panel, impact resistance performance of the cover window and the durability thereof may be improved.

Figure 10:
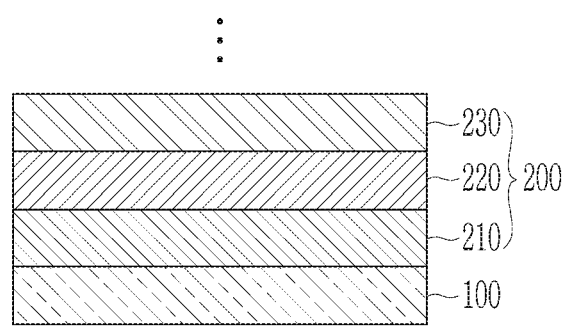
FIG. 10 shows cross-sectional view of a display device according to an embodiment of the present invention.

FIG. 10 shows cross-sectional view of a display device 10 according to an embodiment.

The display device 10 may include a display panel 100 and a cover window 200 positioned on the display panel 100, and the cover window 200 may include at least three modulus layers 210, 220, and 230. The modulus layers 210, 220, and 230 may have higher modulus at higher layers. For example, the modulus of the second modulus layer 220 may be greater than the modulus of the first modulus layer 210, and the modulus of the third modulus layer 230 may be greater than the modulus of the second modulus layer 220. Regarding the cover window 200 in a multi-layered structure, the modulus may gradually increase from the first modulus layer 210 toward the third modulus layer 230. Predetermined moduli of the modulus layers may be implemented by adjusting the ratio of the glass fibers obtained by changing the density and/or the diameter of the glass fibers arranged on the modulus layer. The highest modulus layer, which is the outermost layer of the window 200, may most greatly contribute to an improvement of surface hardness of the cover window 200, and the lowest modulus layer, which is the innermost layer of the window 200, may most greatly contribute to an improvement of impact resistance of the display device 10.

In an embodiment, glass fillers, such as glass beads and glass flakes, having shaped glass materials in various ways may be used together with the glass fibers or instead of the glass fibers, as a material for adjusting the modulus of the cover window 200.

A configuration of the display panel 100 included by the display device 10 according to an embodiment may be described focusing on the display area DA.

Figure 11:
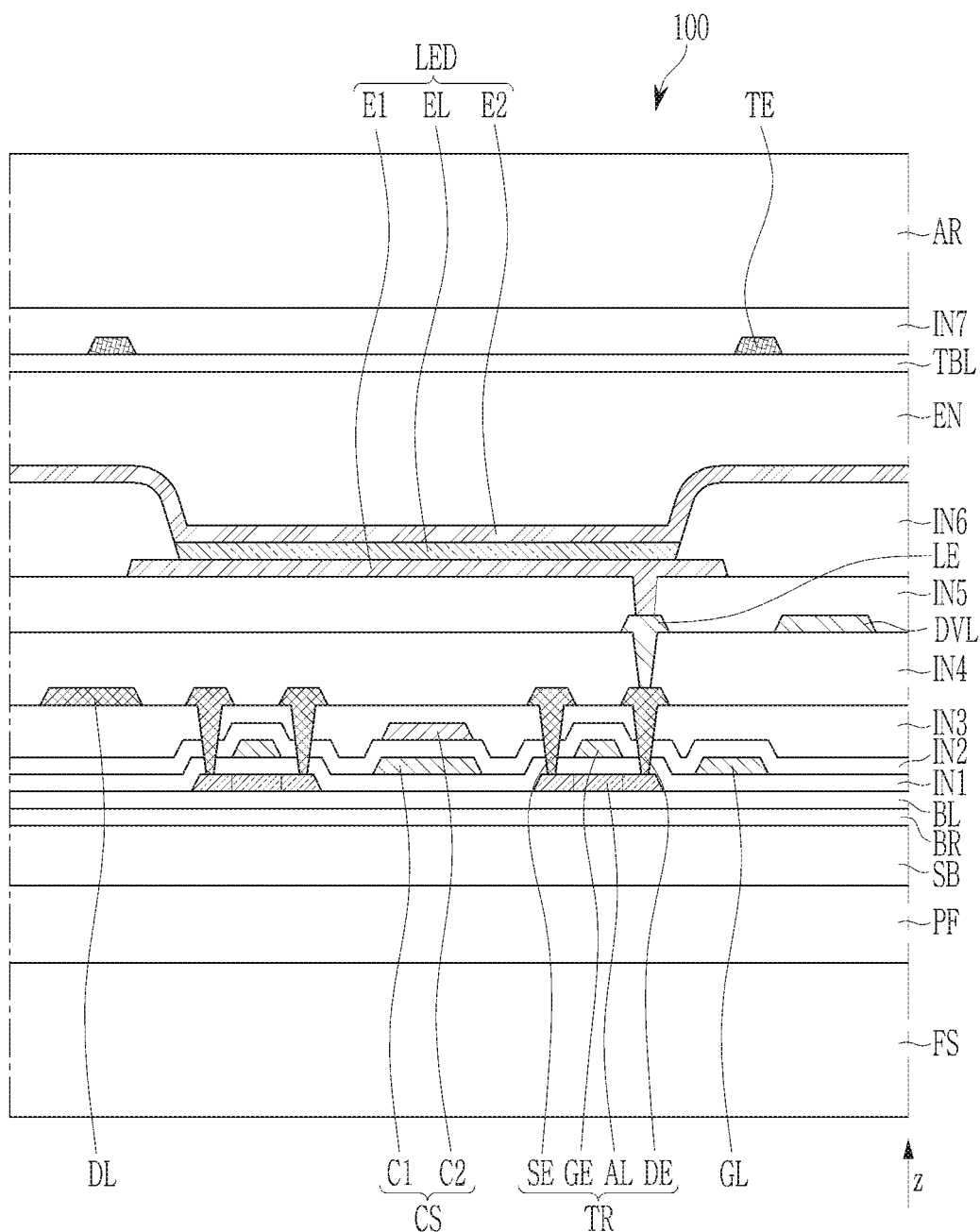
FIG. 11 shows a cross-sectional view of a display panel according to an embodiment of the present invention.

FIG. 11 shows a cross-sectional view of a display panel 100 according to an embodiment.

Referring to FIG. 11, the display panel 100 may include a substrate SB, a transistor TR formed on the substrate SB, and a light emitting diode LED connected to the transistor TR. The light emitting diode LED may correspond to a pixel that is a minimum unit for displaying an image on the display panel 100. The cross-section shown in FIG. 10 may substantially correspond to one pixel area.

The substrate SB may be a plastic substrate including polymers such as a polyimide, a polyamide, and a polyethylene terephthalate, and may be flexible. The substrate SB may be a glass substrate and may be rigid.

When the substrate SB is a plastic substrate, a barrier layer BR for preventing permeation of moisture or oxygen may be positioned on the substrate SB. The barrier layer BR may include or may be formed of an inorganic insulating material such as a silicon nitride ($SiN_x$), a silicon oxide ($SiO_x$), and a silicon oxynitride ($SiO_xN_y$), and may be a single layer or a multilayer.

A buffer layer BL may be positioned on the barrier layer BR. The buffer layer BL may include or may be formed of an inorganic insulating material such as a silicon nitride ($SiN_x$), a silicon oxide ($SiO_x$), and a silicon oxynitride ($SiO_xN_y$), and may be a single layer or a multilayer.

A semiconductor layer AL of a transistor TR may be positioned on the buffer layer BL. The semiconductor layer AL may include a first region, a second region, and a channel region between the first and second regions. The semiconductor layer AL may include or may be formed of one of amorphous silicon, polycrystalline silicon, and an oxide semiconductor. For example, the semiconductor layer AL may include or may be formed of low-temperature polysilicon (LTPS) or may include or may be formed of an oxide semiconductor material including at least one of zinc (Zn), indium (In), gallium (Ga), and tin (Sn). For example, the semiconductor layer may include or may be formed of an indium-gallium-zinc oxide (IGZO).

An insulating layer IN1 may be positioned on the semiconductor layer AL. The insulating layer IN1 may include or may be formed of an inorganic insulating material such as a silicon nitride ($SiN_x$), a silicon oxide ($SiO_x$), and a silicon oxynitride ($SiO_xN_y$), and may be a single layer or a multilayer.

A first gate conductive layer including a gate electrode GE of the transistor TR, a gate line GL, and a first electrode C1 of the capacitor CS may be positioned on the insulating layer IN1. The first gate conductive layer may be made of a same material in a same process. The first gate conductive layer may include or may be formed of molybdenum (Mo), aluminum (Al), copper (Cu), or titanium (Ti), and may be a single layer or a multilayer.

An insulating layer IN2 may be positioned on the first gate conductive layer. The insulating layer IN2 may include or may be formed of an inorganic insulating material such as a silicon nitride ($SiN_x$), a silicon oxide ($SiO_x$), and a silicon oxynitride ($SiO_xN_y$), and may be a single layer or a multilayer.

A second gate conductive layer including a second electrode C2 of the capacitor CS may be positioned on the insulating layer IN2. The second gate conductive layer may be made of a same material in a same process. The second gate conductive layer may include or may be formed of molybdenum (Mo), aluminum (Al), copper (Cu), or titanium (Ti), and may be a single layer or a multilayer.

An insulating layer IN3 may be positioned on the insulating layer IN2 and the second gate conductive layer. The insulating layer IN2 may include or may be formed of an inorganic insulating material such as a silicon nitride ($SiN_x$), a silicon oxide ($SiO_x$), and a silicon oxynitride ($SiO_xN_y$), and may be a single layer or a multilayer.

A first data conductive layer including a first electrode SE and a second electrode DE of the transistor TR, and a data line DL, may be positioned on the insulating layer IN3. The first electrode SE and the second electrode DE may be respectively connected to the first region and the second region of the semiconductor layer AL through contact holes of the insulating layers IN1, IN2, and IN3. One of the first electrode SE and the second electrode DE is a source electrode and the other is a drain electrode. The first data conductive layer may be made of a same material in a same process. The first data conductive layer may include or may be formed of aluminum (Al), platinum (Pt), palladium (Pd), silver (Ag), magnesium (Mg), gold (Au), nickel (Ni), neodymium (Nd), iridium (Jr), chromium (Cr), calcium (Ca), molybdenum (Mo), titanium (Ti), tungsten (W), or copper (Cu), and may be a single layer or a multilayer.

An insulating layer IN4 may be positioned on the first data conductive layer. The insulating layer IN4 may include or may be formed of an organic insulating material such as a polymer including poly(methyl methacrylate) and polystyrene, a polymer derivative having a phenol-based group, an acryl-based polymer, an imide-based polymer (e.g., a polyimide), or a siloxane-based polymer.

A second data conductive layer including a driving voltage line DVL and a connecting electrode LE may be positioned on the insulating layer IN4. The connecting electrode LE may be connected to the second electrode DE through a contact hole of the insulating layer IN4. The second data conductive layer may be made of a same material in a same process. The second data conductive layer may include or may be formed of aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), or copper (Cu), and may be a single layer or a multilayer.

An insulating layer IN5 may be positioned on the second data conductive layer. The insulating layer IN5 may include or may be formed of an organic insulating material such as a polymer including poly(methyl methacrylate) and polystyrene, a polymer derivative having a phenol-based group, an acryl-based polymer, an imide-based polymer, and a siloxane-based polymer.

A first electrode E1 of the light emitting diode LED may be positioned on the insulating layer IN5. The first electrode E1 may be referred to as a pixel electrode. The first electrode E1 may be connected to the connecting electrode LE through a contact hole of the insulating layer IN5. The first electrode E1 may be electrically connected to the second electrode DE and may receive a driving current for controlling luminance of the light emitting diode LED. The transistor TR connected to the first electrode E1 may be a driving transistor or a transistor electrically connected to the driving transistor. The first electrode E1 may be made of a reflective conductive material, a semi-transmissive conductive material, or a transparent conductive material. The first electrode E1 may include or may be formed of a transparent conductive material such as an indium tin oxide (ITO) and an indium zinc oxide (IZO). The first electrode E1 may include or may be formed of metal such as lithium (Li), calcium (Ca), aluminum (Al), silver (Ag), magnesium (Mg), gold (Au), and a metal alloy thereof.

An insulating layer IN6 may be positioned on the insulating layer IN5. The insulating layer IN6 may be referred to as a pixel defining layer or a partition wall layer, and may have an opening overlapping the first electrode E1. The insulating layer IN5 may include or may be formed of an organic insulating material such as an acryl-based polymer and an imide-based polymer.

An emission layer EL may be positioned on the first electrode E1. At least one of a hole injection layer, a hole transfer layer, an electron transfer layer, and an electron injection layer in addition to the emission layer EL may be positioned on the first electrode E1.

A second electrode E2 may be positioned on the emission layer EL. The second electrode E2 may be referred to as a common electrode. The second electrode E2 may have optical transmission by forming a thin layer with metal having a low work function such as calcium (Ca), barium (Ba), magnesium (Mg), aluminum (Al), silver (Ag), and a metal alloy thereof. The second electrode E2 may include and may be formed of a transparent conductive oxide such as an indium tin oxide (ITO) and an indium zinc oxide (IZO).

The first electrode E1, the emission layer EL, and the second electrode E2 of the respective pixels may configure a light emitting diode LED such as an organic light emitting diode. The first electrode E1 may be an anode of the light emitting diode LED, and the second electrode E2 may be a cathode of the light emitting diode LED.

An encapsulation layer EN may be positioned on the second electrode E2. The encapsulation layer EN may encapsulate the light emitting diode LED to prevent permeation of moisture or oxygen from the outside. The encapsulation layer EN may be a thin film encapsulation layer including at least one inorganic layer and at least one organic layer, for example, an inorganic layer/an organic layer/an inorganic layer.

A buffer layer TBL may be positioned on the encapsulation layer EN. The buffer layer TBL may include or may be formed of an inorganic insulating material such as a silicon nitride ($SiN_x$), a silicon oxide ($SiO_x$), and a silicon oxynitride ($SiO_xN_y$), and may be a single layer or a multilayer.

A touch sensor layer including a touch electrode TE may be positioned on the buffer layer TBL. The touch electrode TE may have a mesh shape having an opening overlapping the light emitting diode LED.

An insulating layer IN7 for covering the touch electrode TE may be positioned on the touch sensor layer. The insulating layer IN7 may include an inorganic insulating material such as a silicon nitride ($SiN_x$), a silicon oxide ($SiO_x$), and a silicon oxynitride ($SiO_xN_y$), and may be a single layer or a multilayer.

An antireflection layer AR for reducing reflection of external light may be positioned on the insulating layer IN7. The antireflection layer AR may include or may be a polarization layer. The antireflection layer AR may be attached by an adhesive or may be formed on the insulating layer IN7.

When the substrate SB is a plastic substrate, a patterned film PF (also referred to as a protection film) may be positioned below the substrate SB. The patterned film PF may protect the display panel 100 in a process for manufacturing a display device, and may be referred to as a protection film. The patterned film PF may include or may be formed of polymers such as a polyethylene terephthalate, a polyethylene naphthalate, a polyimide, and a polydimethylsiloxane.

A functional sheet FS including at least one of a cushion layer, a radiation sheet, a light blocking sheet, a water resistant tape, or an electromagnetic blocking film may be positioned below the patterned film PF. The functional sheet FS may protect the display panel 100 from rear side conditions (e.g., impacts, electromagnetic waves, heat, noise, etc.,), and may be referred to as a cover panel, a protecting sheet, or a lower sheet.

While the inventive concept has been described in connection with what is presently considered to be embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device comprising
a display panel and a cover window disposed on the display panel,
wherein the cover window includes:
a first layer having a first Young's modulus, and
a second layer disposed on the first layer and having a second Young's modulus greater than the first Young's modulus,
wherein each of the first layer and the second layer includes a polymer resin and glass fibers, and
wherein a volume ratio of the glass fibers in the first layer is less than a volume ratio of the glass fibers in the second layer.

2. The display device of claim 1,
wherein a density of the glass fibers in the first layer is lower than a density of the glass fibers in the second layer.

3. The display device of claim 2,
wherein an average diameter of the glass fibers included in the first layer is equal to an average diameter of the glass fibers included in the second layer.

4. The display device of claim 2,
wherein an average gap among the glass fibers that are included in the first layer and are adjacent in a horizontal direction is greater than an average gap among the glass fibers that are included in the second layer and are adjacent in the horizontal direction.

5. The display device of claim 1,
wherein an average diameter of the glass fibers included in the first layer is less than an average diameter of the glass fibers included in the second layer.

6. The display device of claim 5,
wherein an average gap among the glass fibers that are included in the first layer and are adjacent in a horizontal direction is equal to an average gap among the glass fibers that are included in the second layer and are adjacent in the horizontal direction.

7. The display device of claim 5,
wherein an average gap among the glass fibers that are included in the first layer and are adjacent in a horizontal direction is greater than an average gap among the glass fibers that are included in the second layer and are adjacent in the horizontal direction.

8. The display device of claim 1,
wherein the first layer and the second layer are integrated into a single layer, and
a polymer resin of the first layer and a polymer resin of the second layer include a same material.

9. The display device of claim 1,
wherein the cover window is attached to the display panel by an adhesive layer or is coated on the display panel.

10. The display device of claim 1,
wherein in each of the first layer and the second layer, a refractive index difference between the polymer resin and a material of the glass fibers is less than 0.01 to prevent the glass fibers from being visible from each of the first layer and the second layer.

* * * * *